US008730250B2

(12) United States Patent
Tanabe et al.

(10) Patent No.: US 8,730,250 B2
(45) Date of Patent: May 20, 2014

(54) IMAGE PROCESSOR AND COMMAND PROCESSING METHOD

(75) Inventors: Yasuki Tanabe, Tokyo (JP); Takashi Miyamori, Kanagawa (JP); Shunichi Ishiwata, Chiba (JP); Katsuyuki Kimura, Kanagawa (JP); Takahisa Wada, Kanagawa (JP); Keiri Nakanishi, Kanagawa (JP); Masato Sumiyoshi, Tokyo (JP); Ryuji Hada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1284 days.

(21) Appl. No.: 12/540,798

(22) Filed: Aug. 13, 2009

(65) Prior Publication Data

US 2010/0110289 A1 May 6, 2010

(30) Foreign Application Priority Data

Nov. 5, 2008 (JP) .................................. 2008-284211
Feb. 10, 2009 (JP) .................................. 2009-028994

(51) Int. Cl.
*G09G 5/02* (2006.01)

(52) U.S. Cl.
USPC ............................ 345/522; 345/600; 345/613

(58) Field of Classification Search
CPC ............. G06T 1/00; G06T 1/005; H04N 1/00
USPC ................................................ 345/606–616
See application file for complete search history.

(56) References Cited

U.S. PATENT DOCUMENTS

2009/0106528 A1* 4/2009 Koga ............................... 712/22

FOREIGN PATENT DOCUMENTS

| JP | 5-328384 | 12/1993 |
|---|---|---|
| JP | 7-49961 | 2/1995 |
| JP | 2000-196903 | 7/2000 |

OTHER PUBLICATIONS

Machine translation of Japanese Patent Application: JP,2007-080186.*
U.S. Appl. No. 12/876,599, filed Sep. 7, 2010, Tanabe, et al.
U.S. Appl. No. 12/559,962, filed Sep. 15, 2009, Hada, et al.
Keiri Nakanishi, et al., "A 128-Parallel SIMD Image Signal Coprocessor with High Area Efficiency", Cool Chips XII, Apr. 15-17, 2009, p. 377-379.
"Image Processing for Digital Cameras Toshiba Reduces Circuit Design Timeframe to 1/4", Nikkei Sangyo Shiban, Apr. 21, 2009, p. 11 (with English Translation).

* cited by examiner

*Primary Examiner* — Kee M Tung
*Assistant Examiner* — Sing-Wai Wu
(74) *Attorney, Agent, or Firm* — Oblon, Spivak, McClelland, Maier & Neustadt, L.L.P.

(57) ABSTRACT

An image processor includes a video input unit that counts the number of input pixel data and a command fetch/issue unit calculates, when a command including information concerning a relative position register in which a delay amount from input of pixel data until execution of a command is stored is fetched, a pixel position of processing target pixel data based on the delay amount and a count result and determines, based on the calculated pixel position, whether signal processing should be performed or specifies an operand used in arithmetic operation.

12 Claims, 13 Drawing Sheets

BACKGROUND ART

FIG.2

| R | GR |
|---|----|
| GB | B |

FIG.3

| COMMAND CODE | BRANCH CONDITION CODE | BRANCH DESTINATION | RELATIVE POSITION REGISTER NUMBER |
|---|---|---|---|

```
0001:  v%2!=0 && h % 2!=0
0010:  v%2!=0 && h % 2==0
0011:  v%2!=0
0100:  v%2==0 && h%2 !=0
0101:  (v%2==0 && h%2 !=0) || (v%2!=0 && h % 2!=0)
0110:  (v%2==0 && h%2 !=0) || (v%2!=0 && h % 2==0)
0111:  (v%2==0 && h%2 !=0) || v%2!=0
1000:  v%2==0 && h % 2==0
1001:  v%2==0 && h % 2==0 || (v%2!=0 && h % 2!=0)
1010:  v%2==0 && h % 2==0 || (v%2!=0 && h % 2==0)
1011:  v%2==0 && h % 2==0 || v%2!=0
1100:  v%2==0
1101:  v%2==0 || (v%2!=0 && h % 2!=0)
1110:  v%2==0 || (v%2!=0 && h % 2==0)
0000:  BRANCH CONDITION IS ALWAYS DISSATISFIED
1111:  BRANCH CONDITION IS ALWAYS SATISFIED
```

FIG.9

```
if( (v%2) == 0 && (h%2) == 0){ // R PIXEL
  Out = In[v][h] + BASE_R;
}
else if( (v%2) == 0 && (h%2) == 1){ // GR PIXEL
  Out = In[v][h] + BASE_GR;
}
else if( (v%2) == 1 && (h%2) == 0){ // GB PIXEL
  Out = In[v][h] + BASE_GB;
}
else if( (v%2) == 1 && (h%2) == 1){ // B PIXEL
  Out = In[v][h] + BASE_B;
}
```

BACKGROUND ART

FIG.15

| OPERATION CODE ADD | ... | OPERAND REGISTER NUMBER Reg [1] | OPERAND REGISTER ACCESS TYPE Type=1 | ... | RELATIVE POSITION REGISTER NUMBER |
|---|---|---|---|---|---|

IMAGE PROCESSOR AND COMMAND PROCESSING METHOD

CROSS-REFERENCE TO RELATED APPLICATIONS

This application is based upon and claims the benefit of priority from the prior Japanese Patent Application No. 2008-284211, filed on Nov. 5, 2008 and the prior Japanese Patent Application No. 2009-28994, filed on Feb. 10, 2009; the entire contents of which are incorporated herein by reference.

BACKGROUND OF THE INVENTION

1. Field of the Invention

The present invention relates to an image processor and a command processing method.

2. Description of the Related Art

Among various kinds of signal processing executed by an image processor on input image data, there is processing executed according to pixel positions of processing target image data. For example, in some case, image data of a Bayer array in which a 2×2 pixel array (pattern) is "R", "GR", "GB", and "B" in order from the upper left is received as input image data and processing corresponding to pixel positions and colors of the pixels is applied to values (image data) corresponding to the pixels. As a more specific example, positions of GR, GB, and B pixels are filled with interpolated R pixels by using values of R pixels around the positions to form a single color image. In such a case, the image processor determines positions of the pixels and performs interpolation processing according to a determination result. Specifically, the image processor performs processing for determining a pixel position to thereby determine whether a pixel is an R pixel and, when the pixel is a G pixel (a GR or GB pixel) or a B pixel other than the R pixel, performs interpolation processing. The image processor performs the series of processing (the processing for determining a pixel position and the interpolation processing performed according to a determination result) by executing commands according to steps explained below.

Step 1: Execute a command for loading a vertical position (hereinafter represented as "v") and a horizontal position (hereinafter represented as "h") in an image of a processing target pixel to a general-purpose register.

Step 2: Execute a command for loading a relative processing position from image input of a present processing thread to the general-purpose register.

Step 3: Execute a command for performing arithmetic operation of values acquired at step 1 and step 2 to thereby calculate a pixel position of the processing thread and loading the obtained pixel position to the general-purpose register.

Step 4: Execute a command for checking, concerning the pixel position calculated at step 3, whether "v" of the pixel position is an even number position and "h" of the pixel position is an odd number position.

Step 5: Execute a command for checking, concerning the pixel position calculated at step 3, whether "v" of the pixel position is an odd number position.

Step 6: Execute a command for implementing the OR operation of results at steps 4 and 5.

Step 7: Execute a command for instructing, when a result at step 6 is correct, signal processing (interpolation processing) to be executed to branch to a described position and instructing, when the result is not correct, the signal processing not to branch (as a result, the interpolation processing is not performed).

The steps of the interpolation processing for filling the positions of GR, GB, and B pixels with interpolated R pixels using values of R pixels around the positions are explained. However, when the signal processing is applied to only a pixel in a specific position, processing equivalent to steps 1 to 6 is necessary as branch determination processing necessary before the signal processing is performed.

As explained above, to determine whether the signal processing should be applied to a pixel in a specific position (branch determination), the image processor in the past needs to execute the commands at steps 1 to 6 as processing at a pre-stage of the determination (processing for specifying a position of a processing target pixel and determining whether the signal processing should be executed). In other words, it is necessary to execute a large number of commands and an overall calculation amount increases. On the other hand, because the image processor tends to treat image data of a larger size, a reduction in the calculation amount is a problem. Therefore, it is requested to efficiently perform the signal processing and reduce such a calculation amount.

Japanese Patent Application Laid-Open No. H7-49961 discloses a technology for determining a position (a coordinate) of a processing target and executing various kinds of processing according to a determination result and, specifically, a processor for three-dimensional graphic acceleration that determines three-dimensional coordinate information included in input data and performs rendering processing corresponding to a determination result. However, in this processor, a reduction in the calculation amount is not taken into account.

BRIEF SUMMARY OF THE INVENTION

An image processor according to an embodiment of the present invention comprises: a video input unit that counts a number of input pixel data; and a command fetch/issue unit calculates, when a command including information concerning a relative position register in which a delay amount from input of pixel data to the video input unit until execution of a command for the pixel data is stored is fetched, a pixel position of processing target pixel data of the fetched command based on the delay amount stored in the relative position register indicated by the information and a count result in the video input unit and executes, based on the calculated pixel position, processing for determining whether signal processing should be applied to pixel data in the pixel position or processing for specifying an operand used in arithmetic operation for the pixel data in the pixel position.

An image processor according to an embodiment of the present invention comprises: a command fetch/issue unit that includes a target position register, acquires, when a predetermined command is fetched, a pixel position of processing target pixel data of the fetched command from the target position register, and executes, based on the acquired pixel position, processing for determining whether signal processing should be applied to pixel data in the acquired pixel position or processing for specifying an operand used in arithmetic operation for the pixel data in the acquired pixel position, the target position register being reset to zero when signal processing for last pixel data in input image data for one frame ends and being incremented when signal processing for pixel data except the last pixel data ends.

A command processing method according to an embodiment of the present invention comprises: counting a number of input pixel data; calculating, when a command including information concerning a relative position register in which a delay amount from input of pixel data until execution of a command for the pixel data is stored is fetched, a pixel position of processing target pixel data of the fetched command based on the delay amount stored in the relative position register indicated by the information and a count result in the counting; and executing, based on the calculated pixel position, processing for determining whether signal processing should be applied to pixel data in the pixel position or processing for specifying an operand used in arithmetic operation for the pixel data in the pixel position.

BRIEF DESCRIPTION OF THE DRAWINGS

FIG. 2 is a diagram of an example of a pixel pattern (a Bayer array) of input image data;

FIG. 3 is a diagram of a structure example of a branch command;

FIG. 9 is a diagram of an example of processing executed on a pixel array having regularity;

FIG. 15 is a diagram of a designation example of a register in an arithmetic operation command;

DETAILED DESCRIPTION OF THE INVENTION

Exemplary embodiments of an image processor and a command processing method according to the present invention will be explained below in detail with reference to the accompanying drawings. The present invention is not limited to the following embodiments.

Figure 1:
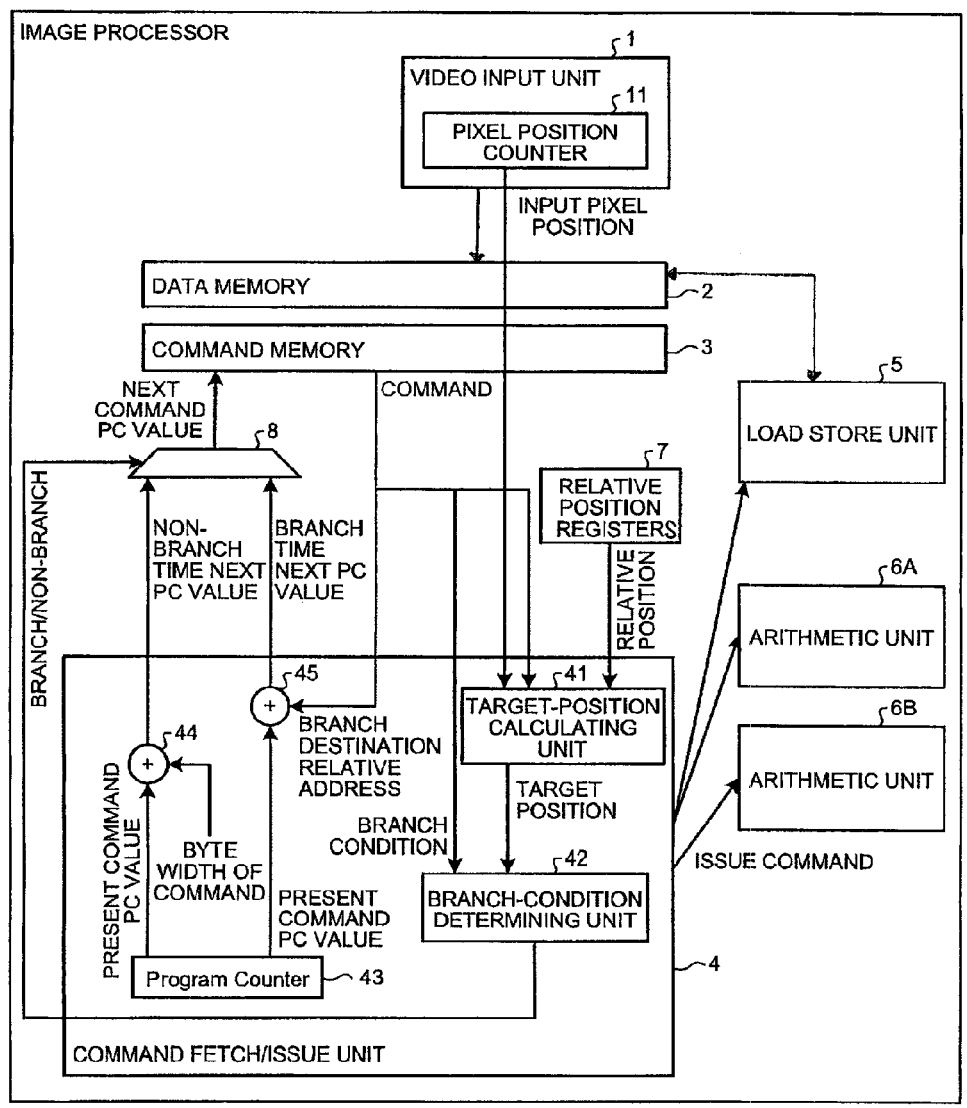
FIG. 1 is a diagram of a configuration example of an image processor according to a first embodiment of the present invention.

FIG. 1 is a diagram of a configuration example of an image processor according to a first embodiment of the present invention. Every time when the video input unit 1 receives the image data, the image processor performs a series of command sequence. Upon receiving the image data, the video input unit 1 causes the data memory 2 to store the received image data. At this time the pixel position counter 11 of the video input unit 1 counts a vertical position ("v") and a horizontal position ("h") of the pixel to be stored within the image. Commands executed in this processor process a pixel which is in a relative position with the pixel that the video input unit 7 received.

For example, in a case performing a filtering process of 7×7 tap to the input image data, when the video input unit 1 stores a pixel which coordinate is 100 vertically and 120 horizontally (v=100, h=120), the 7×7 tap filtering operations can be executed for a pixel at (v=97, h=117). This is because the calculation is performed by referring to pixels which are apart by three pixels in directions right, left, up, and down from the process target pixel. If an attempt of performing a filtering process of 7×7 tap centering a pixel of which coordinate is v=97, h=118 is made, filtering will not be performed because a pixel of which coordinate is v=97, h=121 can be referred to.

Therefore, for example, the command sequence for performing the filtering process of 7×7 tap performs the process for a pixel that is positioned in a relative position of v=−3, h=−3 with respect to the coordinate to be stored. In the present specification, the positional relationship between the coordinate of the pixel stored in the video input unit 1 and the coordinate of the pixel to be processed under a command is defined as a relative position. Furthermore, an absolute position with respect to the input image data of a pixel to be processed under a command in certain timing is defined as a target position.

Here an example of performing a filtering process of 7×7 tap is explained. However, when the filtering process of 7×7 tap is performed on the input image data, and assuming that a filtering process of 3×3 tap is further performed on the result of the filtering process of 7×7 tap, the relative position of command sequence for performing the filtering_process of 7×7 tap is different from the relative position of command sequence for performing the filtering process of 3×3 tap.

Specifically, in the former case, the relative position can be v=−3, h=−3 with respect to the coordinate of the pixel to be stored in the video input unit 1. In the latter case, the result of the filtering process of 7×7 tap is referred in the filtering process of 3×3 tap the relative position can be v=−4, h=−4 which is more apart the former case.

The command fetch/issue unit 4 obtains the target position of a certain command by the following procedure. First, the command fetch/issue unit 4 obtains, from the pixel position counter 11, the vertical coordinate and horizontal coordinate of the pixel within the input image stored in the video input unit 1.

Next, the command fetch/issue unit 4 obtains a relative position of a pixel to be processed by the command from the relative position registers 7. Specifically, as the command includes the relative position register number that indicates the specific register number of the relative position registers 7, the command fetch/issue unit 4 obtains the relative position from the relative position registers 7 in accordance with the relative position register number.

Last, the command fetch/issue unit 4 calculates the target position based on the vertical coordinate, horizontal coordinate, and the target position. The image processor according to this embodiment includes a video input unit 1 that receives a video signal (image data) from the outside, a data memory 2 for storing arithmetic data, a command memory 3 for storing information (a command) that describes processing content, a command fetch/issue unit 4 that fetches and issues a command, a load store unit 5 that executes load store in the data memory 2, arithmetic units 6A and 6B that carry out an arithmetic operation indicated by the command stored in the command memory 3, a relative position register 7 that stores information indicating a processing delay amount with respect to a value (a pixel) indicated by a pixel position counter, and a selector 8 that selects any one of two program counter (PC) values issued by the command fetch/issue unit 4.

The video input unit 1 includes a pixel position counter 11 that counts input data (pixel data) and generates information (a count value) indicating a position of the input data. The command fetch/issue unit 4 includes a target-position calculating unit 41 that calculates, based on the count value output from the pixel position counter 11, a pixel position of processing target data of a command to be issued next, a branch-condition determining unit 42 that performs, when a fetched command is a branch command, branch determination based on a branch condition designated by the branch command, a program counter 43 that outputs a program counter value (a PC value) of a present command, an adder 44 that adds the length (Byte width) of a command to the output value (the PC value) from the program counter 43 and generates a PC value selected at non-branch time (non-branch time next PC value), and an adder 45 that adds a branch destination relative address indicated by the branch command to the output value from the program counter 43 and generates a PC value selected at branch time (branch time next PC value).

The image processor shown in FIG. 1 is an image processor that applies predetermined signal processing such as pixel interpolation, color conversion, contour correction processing, and filtering to image data input thereto. In particular, when the image processor applies the signal processing to only a pixel in a specific position in an image, the image processor efficiently performs processing for determining a pixel position of processing target image data that needs to be performed at a stage before the signal processing is executed. Details of the processing for determining a pixel position of processing target image data (pixel position determining operation) are explained below with reference to the drawings. The image processor executes the predetermined signal processing such as the pixel interpolation and the color conversion in an existing general processing procedure. Therefore, explanation of the signal processing itself is omitted.

Pixel position determining operation performed when input image data to the image processor is the Bayer array of the pixel pattern shown in FIG. 2 is explained.

When a video signal (image data) is input to the image processor shown in FIG. 1, this image data is stored in the video input unit 1. A count value of the pixel position counter 11 is incremented according to the input of the image data. Specifically, the count value is incremented to a value corresponding to a pixel position of latest input image data (image data input last).

When signal processing corresponding to the pixel position is executed on the image data (the input image data) received from the outside by the video input unit 1, the command fetch/issue unit 4 performs branch determination using the count value of the pixel position counter 11 (the pixel position of the input image data), a value stored in the relative position register 7, and a determination condition described in a command. The command fetch/issue unit 4 determines whether the signal processing should be executed on the input image data. Further, the command fetch/issue unit 4 generates a PC value (a first PC value) in executing the signal processing (performing branching) and a PC value (a second PC value) in not executing the signal processing and outputs the generated PC values and a result of the determination concerning whether the signal processing should be executed to the selector 8. The signal processing corresponding to the pixel position is executed when a branch command is fetched. Detailed operation performed by the command fetch/issue unit 4 when the branch command is fetched is explained later.

The selector 8 selects the input first PC value or second PC value according to the determination result received from the command fetch/issue unit 4 and stores the selected PC value in a predetermined area in the command memory 3. When the determination result indicates "branching is performed (the signal processing is executed)", the first PC value is selected. Otherwise, the second PC value is selected.

Detailed operation performed when the command fetch/issue unit 4 fetches the branch command is explained. The structure of the branch command is as shown in FIG. 3. The branch command includes a command code, a branch condition code, a branch destination, and a relative position register number. The "command code" is information indicating a type of a command and is information included in commands other than the branch command.

When a command is fetched, the command fetch/issue unit 4 calculates a pixel position of processing target pixel data of the fetched command. A branch command will be performed using the pixel position calculated by the command fetch/issue unit 4 and the branch condition code. The "branch condition code" designates a branch condition using the pixel position. For example, the branch condition code indicates in which combination to branch among four combinations. The four combinations made of even-number/odd-number of "v" coordinate (namely, whether "v" corresponds to the even-number or odd-number) and "h" coordinate.

The command fetch/issue unit 4 compares the branch condition code and the pixel position, and when the pixel position corresponds to the position to branch the command fetch/issue unit 4 branches in accordance with the branch destination. The "branch destination" of the branch command, specifies a branch destination, when the branch condition is satisfied. For example, the branch destination designates a relative position of a command.

The "relative position register number" is information concerning a referent in referring to the relative position registers 7 described later.

When the branch command is fetched, in the command fetch/issue unit 4, target position will be calculated by the target position calculation unit 41. The target position calculation unit 41 receives a pixel position value from the Pixel Position Counter 11 in the video input unit 1 and a relative position from the relative position register 7. The Pixel Position Counter 11 indicates a pixel position that was received by the video input unit 1 at that time, or a pixel position that will be received by the video input unit 1.

The relative position is information indicating a relation between a pixel position (a value of the pixel position counter 11) of pixel data input to the video input unit 1 and a pixel position of pixel data that is a command processing target fetched by the command fetch/issue unit 4 at that point. The relative position will be referenced by accessing a register using the relative register position number. Specifically, the relative position is information indicating a difference (a delay amount) between these pixel positions. In other words, the relative position is information indicating a time lag (a delay amount) from the input of certain pixel data to the image processor (the video input unit 1) until the execution of a command on the input image data. Therefore, a target position is calculated by using the following formula. The target position includes position information in the vertical direction (represented as "v") and position information in the horizontal direction (represented as "h") in an image.

(Target position)=(input pixel position)−(relative position)

The branch-condition determining unit 42 executes, according to content of a branch command code, processing explained below and performs branch determination concerning the target position.

1. When a command code indicates a branch command for designating a pattern of vertical 2 pixels×horizontal 2 pixels 1-1. The branch-condition determining unit 42 executes four arithmetic operations of the following Formula (1) on the target position (v, h) calculated by the target-position calculating unit 41 and combines results of the arithmetic operations to generate 4-bit information. The 4-bit information is information (position information) indicating to which position in a 2×2 array the target position corresponds and indicates to which of R, GR, GB, and B the target position corresponds.

$$v\%2==0\&\&h\%2==0, v\%2==0\&\&h\%2!=0, v\%2!=0\&\&h\%2==0, v\%2!=0\&\&h\%2!=0 \quad (1)$$

1-2. The branch-condition determining unit 42 implements the AND operation of the generated 4 bits and 4 bits (4 bits for designating a branch pattern in the 2×2 array) set in a branch condition code in a branch command.

1-3. When a result of the AND operation is "0", the branch-condition determining unit 42 determines that "a branch condition is dissatisfied" and does not perform branching (does not execute the signal processing on pixel data corresponding to the target position). On the other hand, when the result of the AND operation is other than "0", the branch-condition determining unit 42 determines that "the branch condition is satisfied" and performs branching.

Figures 4, 5:
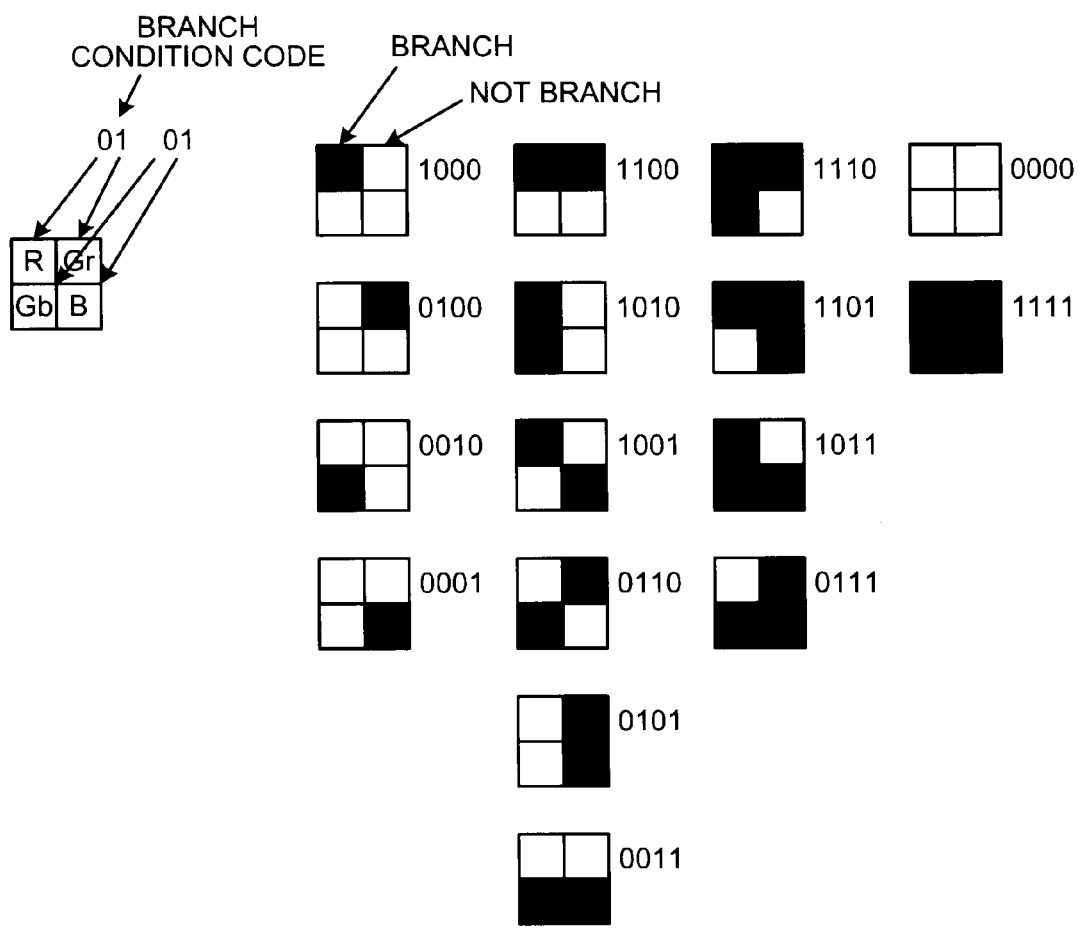
FIG. 4 is a diagram of an example of combinations of branch condition codes.
FIG. 5 is a diagram of correspondence between the branch condition codes and patterns of branching and non-branching in a 2×2 array.

By performing the branch determination according to the procedure explained above, the branch-condition determining unit 42 can perform, using a pattern (a combination) of a 4-bit branch condition code, branch designation for image data (e.g., a signal of the Bayer array pattern shown in FIG. 2) having regularity for each 2×2 pixels. FIG. 4 is a diagram of an example of combinations of branch condition codes.

Specifically, 4 bits of the branch condition code respectively represent the following:

if "v" is an even number position and "h" is an even number position (equivalent to the R pixel shown in FIG. 2), the branch condition is satisfied;

if "v" is an even number position and "h" is an odd number position (equivalent to the GR pixel shown in FIG. 2), the branch condition is satisfied;

if "v" is an odd number position and "h" is an even number position (equivalent to the GB pixel shown in FIG. 2), the branch condition is satisfied; and if "v" is an odd number position and "h" is an odd number position (equivalent to the B pixel shown in FIG. 2), the branch condition is satisfied.

These conditions can be designated in combination in the branch command.

FIG. 5 is a diagram of correspondence between branch condition codes and patterns of branching and non-branching in the 2×2 array. An example of branch condition codes corresponding to the image data of the Bayer array shown in FIG. 2 is shown in FIG. 5. For example, when only a signal in the R pixel position is caused to branch to execute signal processing, "1000" is designated as a branch condition code. When signals in the Gr and Gb pixel positions are caused to branch to execute signal processing, "0110" is designated as a branch condition code. Similarly, when signals in all the pixel positions are caused to branch, "1111" is designated as a branch condition code.

Figure 6:
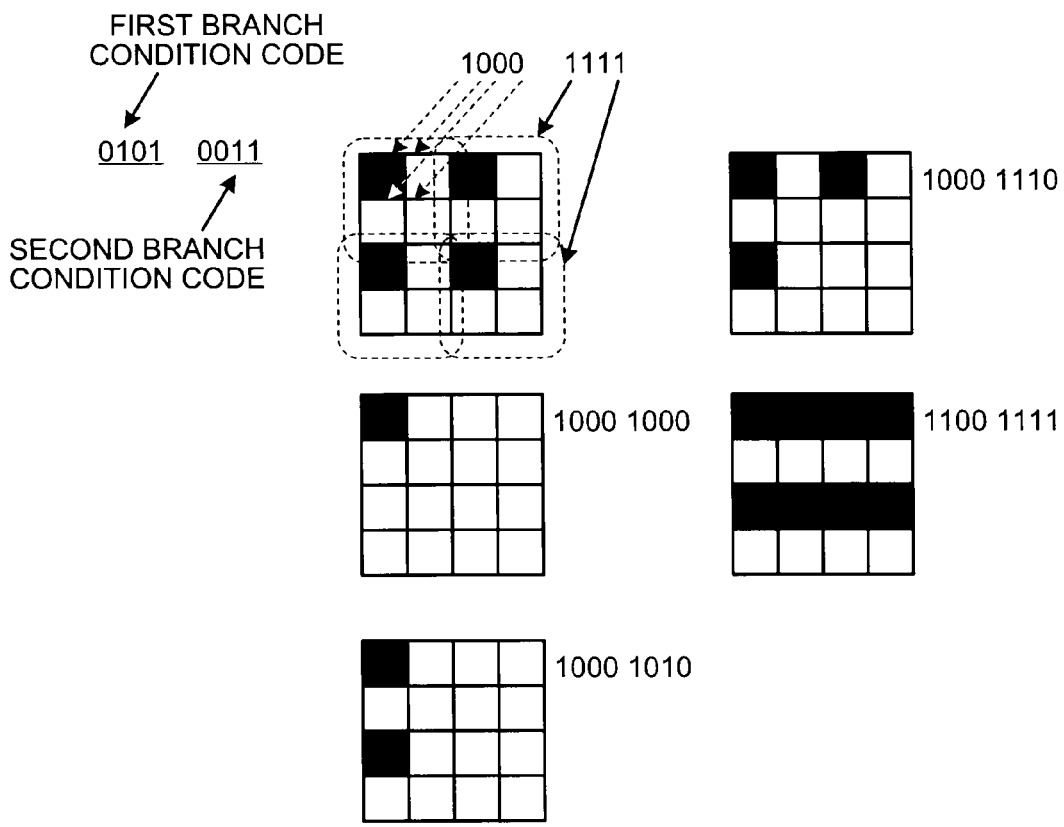
FIG. 6 is a diagram for explaining branch determination operation for a pattern of vertical 4 pixels×horizontal 4 pixels.

2. When a command code indicates a branch command for designating a pattern of vertical 4 pixels×horizontal 4 pixels In this case, as shown in FIG. 6, a branch condition code includes 8 bits in total; 4 bits indicating a branch pattern for pixels of a 2×2 array (equivalent to a first branch condition code shown in the figure) and 4 bits for designating a branch pattern for four 2×2 pixel blocks forming a 4×4 pixel array (equivalent to a second branch condition code shown in the figure). The branch-condition determining unit 42 performs determination using the first branch condition code and performs determination using the second branch condition code. The branch-condition determining unit 42 performs final branch determination using results of the determinations. FIG. 6 is a diagram for explaining a branch determining operation for a pattern of vertical 4 pixels×horizontal 4 pixels.

The branch determining operation by the branch-condition determining unit 42 is explained in detail below.

2-1. As in "when a command code indicates a branch command for designating a pattern of vertical 2 pixels×horizontal 2 pixels" explained above, the branch-condition determining unit 42 executes the four arithmetic operations of Formula (1) on the target position (v, h) calculated by the target-position calculating unit 41 and connects results of the arithmetic operations to generate 4-bit information. The 4-bit information is information indicating which position in the 2×2 array the target position corresponds.

2-2. The branch-condition determining unit 42 implements the AND operation of the generated 4 bits and the first branch condition code in the branch condition code (see FIG. 5).

These steps 2-1 and 2-2 are the same as the steps 1-1 and 1-2 of "when a command code indicates a branch command for designating a pattern of vertical 2 pixels×horizontal 2 pixels" explained above.

When a command code indicates a branch command for designating a pattern of vertical 4 pixels×horizontal 4 pixels, the branch-condition determining unit 42 further executes processing explained below.

2-3. The branch-condition determining unit 42 executes four arithmetic operations of the following Formula (2) on the target position (v, h) and combines results of the arithmetic operations to generate 4-bit information. The 4-bit information is information indicating in which of blocks of the four 2×2 array forming the 4×4 array the target position is included.

$$(v>>1)\%2==0\&\&(h>>1)\%2==0, (v>>1)\%2==0\&\&(h>>1)\%2!=0, (v>>1)\%2!=0\&\&(h>>1)\%2==0, (v>>1)\%2!=0\&\&(h>>1)\%2!=0 \quad (2)$$

2-4. The branch-condition determining unit 42 implements the AND operation of the 4-bit information generated at step 2-3 and the second branch condition code in the branch condition code (see FIG. 6).

2-5. The branch-condition determining unit 42 further implements the AND operation of results of the AND operation at step 2-2 and the AND operation at step 2-4.

2-6. If a result of the AND operation at step 2-5 is "0", the branch-condition determining unit 42 determines that "the branch condition is dissatisfied". If the result is other than "0", the branch-condition determining unit 42 determines that "the branch condition is satisfied".

By performing the branch determination according to the procedure explained above, as shown in FIG. 6, the branch-condition determining unit 42 can designate, with 8 bits, branch conditions in various patterns corresponding to the 4×4 pixel array.

Figure 7:
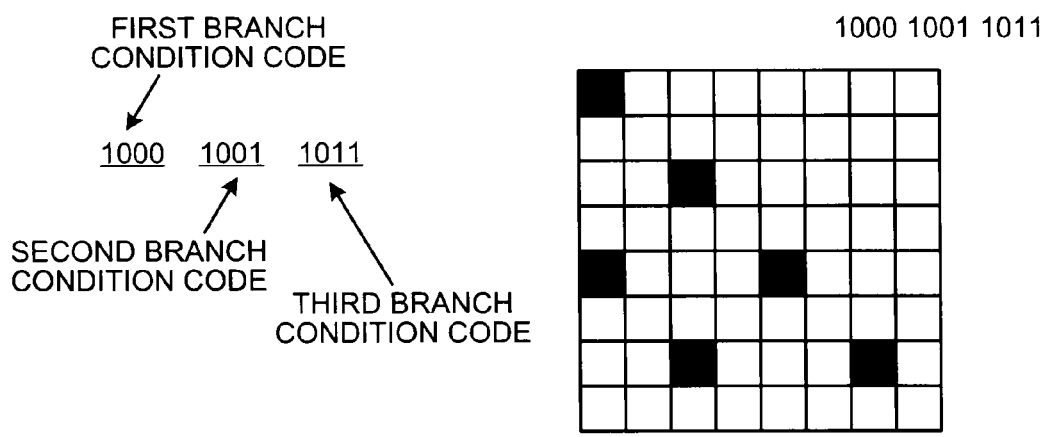
FIG. 7 is a diagram of an example of branch condition codes for a pattern of vertical 8 pixels×horizontal 8 pixels.

3. When a command code indicates a branch command for designating a pattern of vertical 8 pixels×horizontal 8 pixels When a command code indicates a branch command for designating a pattern of vertical 8 pixels×horizontal 8 pixels, branch determination can be performed by further adding 4 bits (a third branch condition code shown in the figure) for designating a pattern for four blocks of a 4×4 array to extend the branch condition code as shown in FIG. 7.

A method of extending the branch determination procedure is the same as the method of extending the branch determination procedure in the 2×2 array to the branch determination procedure in the 4×4 array. Specifically, after executing processing equivalent to steps 2-1 to 2-5, the branch-condition determining unit 42 further shifts the target position (v, h) by 2 bits and generates, from a result obtained by dividing each of results obtained by the shift (v, h after the shift) by 2, 4-bit information indicating in which of four blocks of the 4×4 array forming an 8×8 array the target position is included. Subsequently, the branch-condition determining unit 42 executes processing for implementing the AND operation of the 4-bit information and the third branch condition code (see FIG. 7). Finally, the branch-condition determining unit 42 implements the AND operation of a result of this AND operation and the result of the AND operation obtained at step 2-5. If a result of the AND operation is "0", the branch-condition determining unit 42 determines that "the branch condition is dissatisfied". If the result is other than "0", the branch-condition determining unit 42 determines that "the branch condition is satisfied".

By using the same method, pattern designation for a pattern of a larger size (a pattern of $2^n$ pixels×$2^n$ pixels, n=4, 5, 6, . . . ) can be performed.

As explained above, in the image processor according to this embodiment, when a branch command is fetched, the command fetch/issue unit 4 specifies, based on a value (a relative position) stored in an area indicated by a relative position register number included in the branch command and a value (a pixel position of latest input image data) of the pixel position counter in the video input unit, a pixel position (a target position) of processing target image data of the branch command. Further, the command fetch/issue unit 4 performs, using a branch condition code described in the branch command, determination (branch determination) for determining whether signal processing is necessary for a signal in the specified target position. This makes it possible to set the number of commands executed for determining a branch condition smaller than that in the past and obtain an image processor with an overall calculation amount.

In the branch determination processing, when an array pattern of determination target pixels is a $2^n$ pixel×$2^n$ pixel pattern (n=2, 3, 4, . . . ) larger than 2 pixels×2 pixels, the command fetch/issue unit 4 executes, for a plurality of times, determination processing same as the branch determination for the 2 pixels×2 pixels pattern while shifting the target position bit by bit and performs final branch determination. This makes it possible to designate a branch condition for all pixels included in the determination target pattern with the number of bits smaller than the number of pixels included in the determination target pattern.

Figure 8:
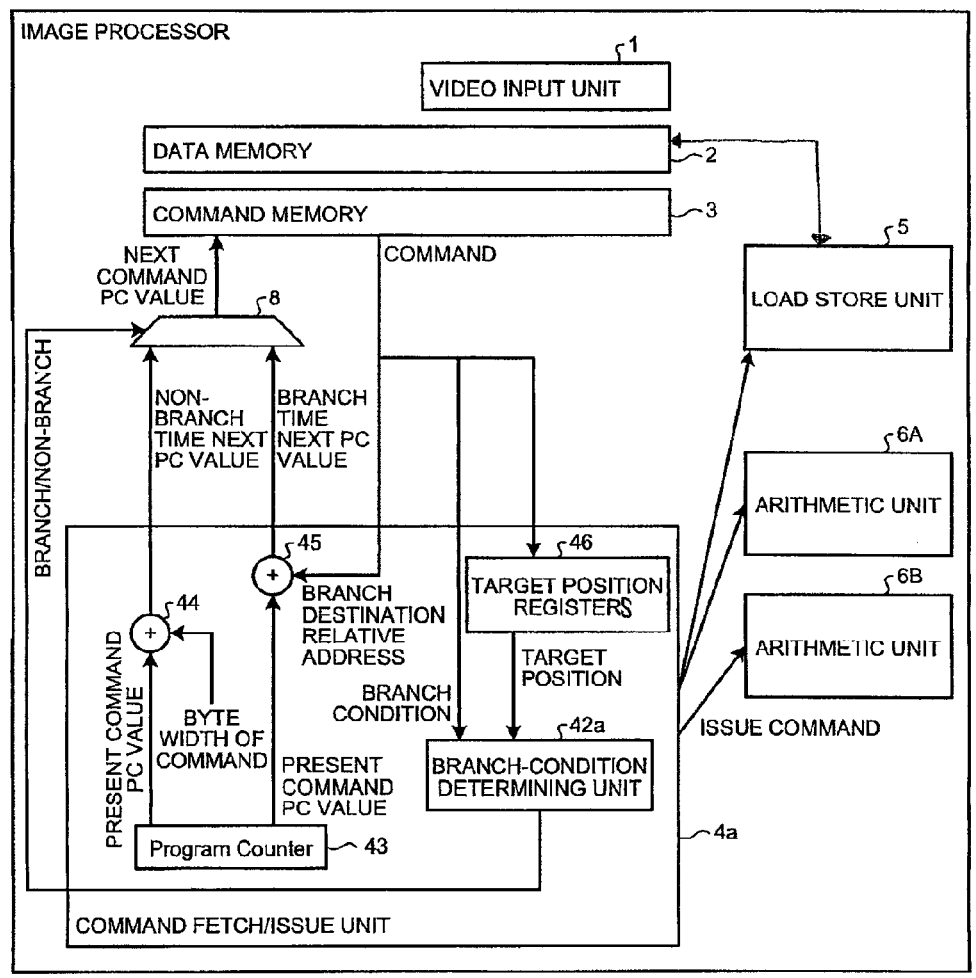
FIG. 8 is a diagram of a configuration example of an image processor according to a second embodiment of the present invention.

FIG. 8 is a diagram of a configuration example of an image processor according to a second embodiment of the present invention. In the image processor according to this embodiment, the relative position register 7 and the command fetch/issue unit 4 of the image processor according to the first embodiment are replaced with a command fetch/issue unit 4a. Components same as those of the image processor according to the first embodiment are denoted by the same reference numerals and signs and explanation of the components is omitted. In the command fetch/issue unit 4a, the target-position calculating unit 41 and the branch-condition determining unit 42 of the command fetch/issue unit 4 are replaced with a target position register 46 and a branch-condition determining unit 42a. The command fetch/issue unit 4a is different from the command fetch/issue unit 4 in that the branch-condition determining unit 42a acquires target position information from the target position register 46.

In a configuration according to FIG. 1, the target position (position of the pixel in which a given command performs processing at a given frame) is calculated by the target-position calculating unit 41 based on: the position of the image data (input pixel position) the video input unit of the image processor received; and the relative position from the above described position of the pixel.

For the above described reasons, the pixel position counter 11 in the video input unit 1 and the command fetch/issue unit 4 need to be connected each other. Meanwhile, in a configuration according to FIG. 8, the target position can be obtained by referring to the target position register 46. Thus there is no need to the pixel position counter 11 in the video input unit and the command fetch/issue unit 4a. The image processor according to this embodiment arranges data for one frame of input image data in the data memory 2 and repeats a series of processing for pixel values stored in the data memory 2.

For example, in performing linear interpolation for a certain pixel from peripheral pixels, the image processor acquires a pixel data before the interpolation from a data area of the data memory 2 in which an image frame before the interpolation is stored and, after the interpolation, stores the pixel data in a separate area as data after the interpolation (the image frame after the interpolation). In this case, if multiple instructions are required for the interpolation, these instructions will refer same target position register to get target position. The target position register is not incremented before all the instructions required for the interpolation are executed. After all instructions are executed, the target position register will be incremented. Therefore, the image processor according to this embodiment includes the target position register 46 that can be referred to from the branch-condition determining unit 42a. A value (information concerning a pixel position) stored in the target position register 46 is incremented or reset to zero by using a dedicated command when the interpolation processing ends for one pixel. Specifically, the image processor resets the value to zero when the interpolation processing for a last pixel in one pixel frame ends. The image processor increments the value when the interpolation processing for pixels other than the last pixel ends. In the command fetch/issue unit 4a, when a fetched command is a branch command, the branch-condition determining unit 42a acquires information concerning a present pixel position from the target position register 46 and performs the branch determination explained in the first embodiment using the acquired target position information. Details of the branch determination processing are as explained in the first embodiment.

When such a configuration is adopted, effects same as those of the first embodiment are obtained. Further, it is unnecessary to include a relative position register number in the branch command.

In the first and second embodiments, the technology for efficiently performing the processing for determining a pixel position of processing target image data to hold down a calculation amount in executing a branch command is explained. An arithmetic operation command can also be efficiently executed by using the same method. Therefore, in this embodiment and subsequent embodiments, an image processor that can efficiently execute an arithmetic operation command is explained.

In image processing, in some case, the image processor performs the image processing with a pixel array having regularity such as the Bayer array shown in FIG. 2 as input and executes, on respective pixels, processing for which an arithmetic operation procedure is the same (in an example shown in FIG. 9, addition processing for input In[v][h] is performed irrespective of a pixel position) and only variables in use (BASE_R, BASE_GR, BASE_GB, and BASE_B) are different as shown in FIG. 9. In the past, operation in performing such processing shown in FIG. 9 is executed at steps explained below.

Step 1: Acquire "v" and calculate v %2.
Step 2: Test whether a calculation result at step 1 is equivalent to "0".
Step 3: Acquire "h" and calculate h %2.
Step 4: Test whether a calculation result at step 3 is equivalent to "0".
Step 5: Calculate AND of test results at steps 2 and 4.
Step 6: When a calculation result at step 5 does not hold, branch to step 8.
Step 7: Acquire In[v][h] and BASE_R from a register and, after adding up In[v][h] and BASE_R, branch to step 19.
Step 8: Test whether the calculation result at step 3 is equivalent to "1".
Step 9: Calculate AND of test results at steps 2 and 8.
Step 10: When a calculation result at step 9 does not hold, branch to step 12.
Step 11: Acquire In[v][h] and BASE_GR from a register and, after adding up In[v][h] and BASE_GR, branch to step 19.
Step 12: Test whether the calculation result at step 1 is equivalent to "1".
Step 13: Calculate AND of test results at steps 4 and 12.
Step 14: When a calculation result at step 13 does not hold, branch to step 16.
Step 15: Acquire In[v][h] and BASE_GB from a register and, after adding up In[v][h] and BASE_GB, branch to step 19.
Step 16: Calculate AND of the test results at steps 8 and 12.
Step 17: When a calculation result at step 16 does not hold, branch to step 19.
Step 18: Acquire In[v][h] and BASE_B from a register and, after adding up In[v][h] and BASE_B, branch to step 19.
Step 19: End processing shown in FIG. 9 and execute the next command.

As explained above, when the processing shown in FIG. 9 is executed by the procedure in the past, regardless of the fact that calculation content itself in the respective pixels is the same (the addition of In[v][h] and a BASE value corresponding to a pixel position), an amount of commands for branch determination and the like is large (commands at steps 1, 2, 3, 4, 5, 6, 8, 9, 10, 12, 13, 14, 16, and 17). A large number of commands have to be executed for the branch determination. As a result, execution efficiency of the processing is deteriorated (command execution at steps 1, 2, 3, 4, 5, 6, 8, 9, 10, 12, 13, 14, 16, and 17). Regardless of the fact that only the registers referred to are different and the calculation is the same, the registers and the calculation need to be arranged in command code sequences. As a result, an amount of command codes increases (commands at steps 7, 11, 15, and 18).

Therefore, the image processor according to this embodiment adopts a configuration and operation explained below to thereby solve the problems and efficiently execute an arithmetic operation command.

Figure 10:
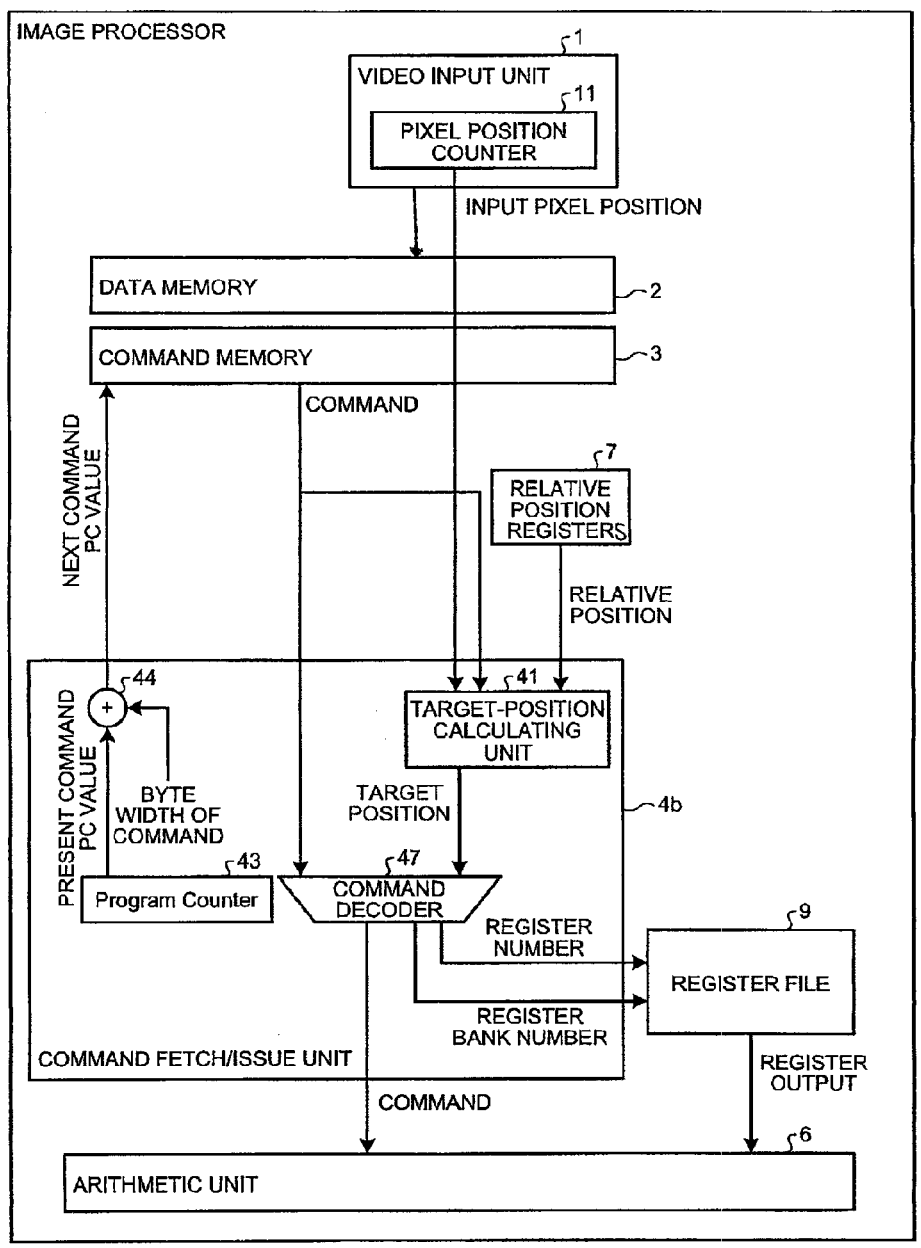
FIG. 10 is a diagram of a configuration example of an image processor according to a third embodiment of the present invention.

FIG. 10 is a diagram of a configuration example of the image processor according to the third embodiment. The image processor according to this embodiment includes the video input unit 1, the data memory 2, the command memory 3, a command fetch/issue unit 4b, an arithmetic unit 6, the relative position register 7, and a register file 9. Components same as those included in the image processor according to the first embodiment are denoted by the same reference numerals and signs. In this embodiment, the operation of the components different from those of the image processor according to the first embodiment is mainly explained. The arithmetic unit 6 is the same as the arithmetic units 6A and 6B included in the image processor according to the first embodiment. The number of arithmetic units does not affect the realization of characteristic operation of the image processors according to the embodiments (the characteristic operation of the image processors does not depend on the number of arithmetic units). Therefore, in FIG. 10, for simplification of illustration, the image processor includes only the single arithmetic unit 6.

The command fetch/issue unit 4b includes the target-position calculating unit 41, the program counter 43, the adder 44, and a command decoder 47. When an arithmetic operation command is fetched, the command fetch/issue unit 4b specifies a register in which an operand used for arithmetic operation corresponding to the arithmetic operation command is stored. The target-position calculating unit 41, the program counter 43, and the adder 44 are the same as the explained component at the first embodiment with the same reference numerals.

Figure 11:
FIG. 11 is a diagram of a structure example of an arithmetic operation command.
Figure 12:
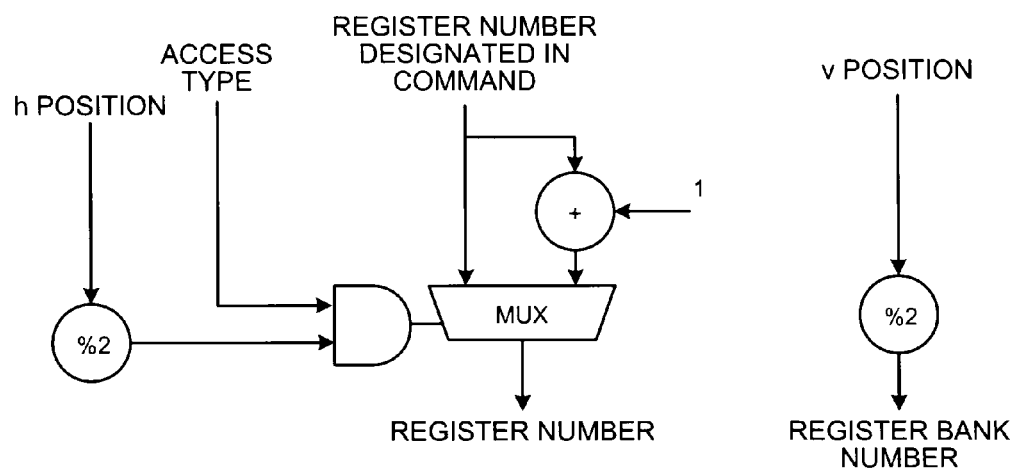
FIG. 12 is a diagram of a configuration example of a command decoder.

The command decoder 47 decodes an input command sequence. When a command to be decoded is a command having a register number of an operand and designation concerning an access type of the register (whether another register should be referred to according to a pixel position of processing target image data) like a command shown in FIG. 11, the command decoder 47 executes processing shown in FIG. 12, decodes the register number and a register bank number, and addresses a register file using the register number and the register bank number. The access type identifies whether to execute register access in consideration of the pixel position or to execute register access in accordance with the value of the operand register number. FIG. 12 is a diagram of a configuration example of the command decoder 47. Like the branch command shown in FIG. 3, the branch command includes a relative position register number. The relative position register number is passed to the target-position calculating unit 41. The target-position calculating unit 41 calculates a target position using the relative position register as explained in the first embodiment.

The command decoder 47 adopts the configuration shown in FIG. 12. In access processing to the register file 9, the command decoder 47 executes processing (steps) as explained below.

Step 1: Calculate "a register number designated in a command+1" (add 1 to an operand register number).
Step 2: Calculate whether an "h" component (an "h" position) of a target position calculated by the target-position calculating unit 41 is an odd number.
Step 3: Calculate AND of a result at step 2 and an access type (an operand register access type) in a command.

Step 4: If a result at step 3 is true, set "1" as a register number and, otherwise, directly set the register number designated in the command as a register number.

As operation for obtaining a register bank number, the command decoder 47 executes "processing for executing modulo arithmetic operation by "2" on a "v" component (a "v" position) of the target position calculated by the target-position calculating unit 41 and setting an arithmetic operation result as a register bank number".

Figure 13:
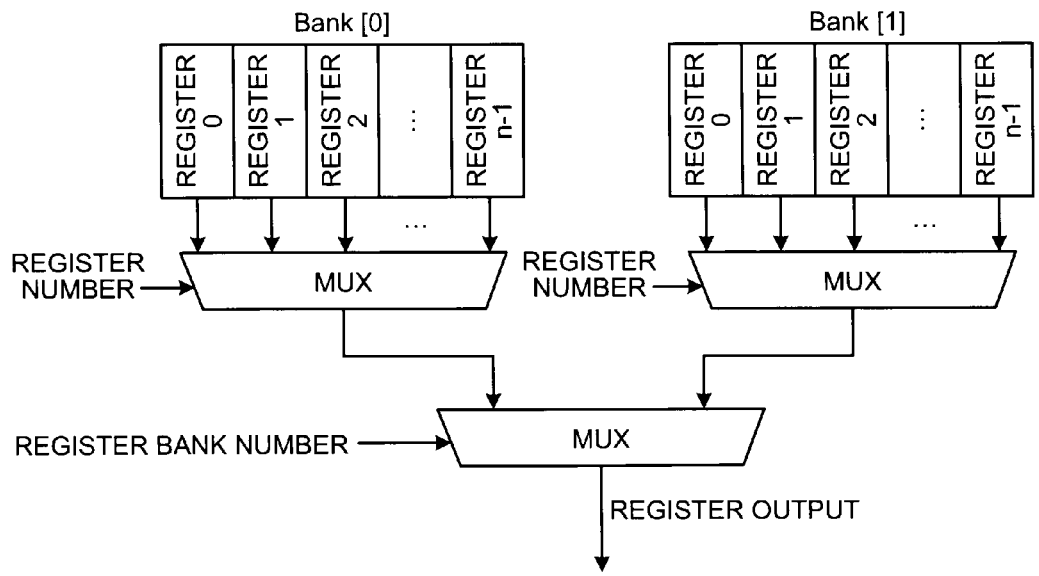
FIG. 13 is a diagram of a configuration example of a register file.

FIG. 13 is a diagram of a configuration example of the register file 9. As shown in the figure, the register file 9 includes two banks. The register file 9 outputs, as a register value, data specified based on the register number and the register bank number, which are obtained by the execution of the operation by the command decoder 47, out of data stored in the register file 9. Specifically, multiplexers (Muss) associated with the respective banks select and output data stored in registers corresponding to the register number input from the command decoder 47. Another multiplexer (hereinafter, "second multiplexer") different from these multiplexers (hereinafter, "first multiplexers") selects data corresponding to the register bank number input from the command decoder 47 among output data from the first multiplexers and outputs the data to the arithmetic unit 6 as finally selected data (operand).

Figure 14:
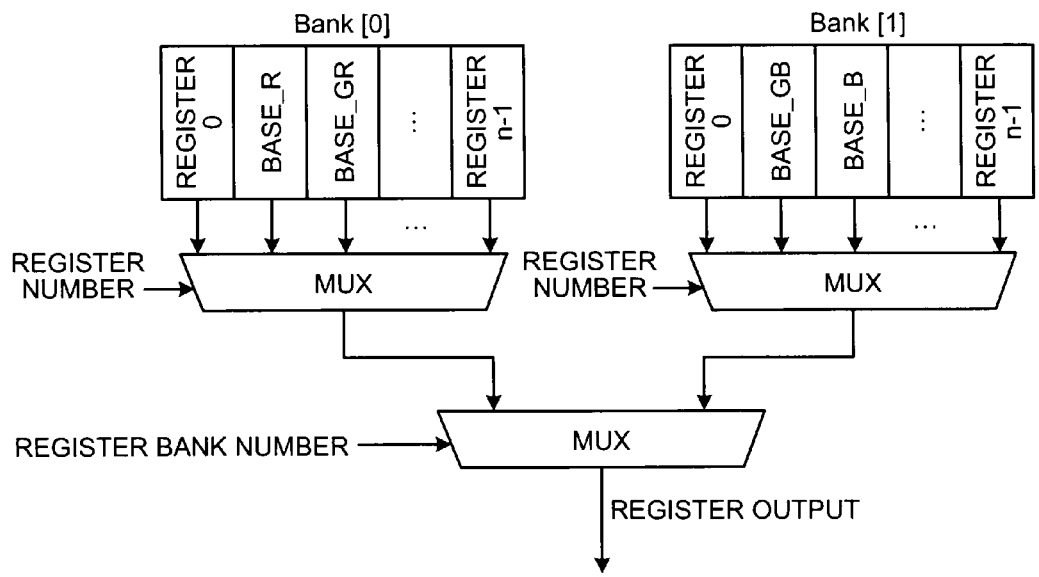
FIG. 14 is a diagram of a data storage example in the register file.

FIG. 14 is a diagram of a data storage example in the register file 9 in the execution of the arithmetic operation shown in FIG. 9. In FIG. 14, among the data used in the arithmetic operation shown in FIG. 9, BASE_R is stored in a register 1 of a bank [0], BASE_GR is stored in a register 2 of the bank [0], BASE_GB is stored in a register 1 of a bank [1], and BASE_B is stored in a register 2 of the bank [1].

FIG. 15 is a diagram of a designation example of a register in an arithmetic operation command. In FIG. 15, a register 1 (Reg[1]) is designated as an operand register number and a type 1 (Type=1) is designated as an operand register access type.

In operation conforming to the examples shown in FIGS. 14 and 15, when "v" is an even number and "h" is an even number (an R pixel position), the register number is 1 and the register bank number is 0, when "v" is an even number and "h" is an odd number (a GR pixel position), the register number is 2 and the register bank number is 0, when "v" is an odd number and "h" is an even number (a GB pixel position), the register number is 1 and the resister bank number is 1, and when "v" is an odd number and "h" is an odd number (a B pixel position), the register number is 2 and the register bank number is 1.

The arithmetic unit 6 receives the data selected and output according to the procedure explained above from the register file 9 and executes arithmetic processing conforming to a command issued from the command fetch/issue unit 4b (the command decoder 47).

As explained above, in the image processor according to this embodiment, the command decoder 47 executes the following steps:

1) fetching arithmetic operation command including operand register number, operand register access type, relative position register number;

2) receiving the target position calculated by the target-position calculating unit 41 using a pixel position from the pixel position counter 11 in the video input unit 1 and a relative position;

3) changing the number of the operand register number and register bank depending on combination of even-number/odd-number of each of "h" coordinate and "v" coordinate; and 4) and selecting a piece of data in the register file 9 using the register number, and the bank number will be used for an operation in the arithmetic unit 6.

Accordingly, in the same command the value to be referred to changes depending on even-number/odd-number of each of "h" coordinate and "v" coordinate of the target position, though; calculation can express the same process in a single command. For example, in the case of Bayer array the color of each pixel (R,G,B) is determined by even-number/odd-number of each of "h" coordinate and "v" coordinate. Accordingly, it is possible to indicate adjustment for applying different gain to each color for the image data with one command.

In the image processor according to the present embodiment, the register to be referred to can be changed depending on even-number/odd-number of each of "h" coordinate and "v" coordinate, thus the above described process can be performed by a command to apply one gain if gain of each color is set in advance to the register to be referred to.

In the case of common processor, the above described processes are implemented at a time of implementing the command by performing: a command to determine whether it is an even number or odd number for each of "h" coordinate and "v" coordinate; a branch command according to the result of the determination; and a command that has different register operand.

In contrast, in the case of the image processor according to the present embodiment, above described processes can be implemented by a single command. The image processor according to the first embodiment of the present invention is capable of performing a branch command without performing a command to determine whether it is an even number or odd number for each of "h" coordinate and "v" coordinate. However, each of the command having different register operand need to be included the command code. In the image processor according to the third embodiment of the present invention, the above command can be described in a single command, thus amount of the command can be reduced.

It is also possible to add components for realizing the characteristic operation of the image processor according to this embodiment to the image processor according to the first embodiment. Specifically, it is also possible to add the command decoder 47 and the register file 9 shown in FIG. 10 to the image processor having the configuration shown in FIG. 1 and realize an image processor that can execute both the characteristic operation of the image processor according to the first embodiment and the characteristic operation of the image processor according to this embodiment.

Figure 16:
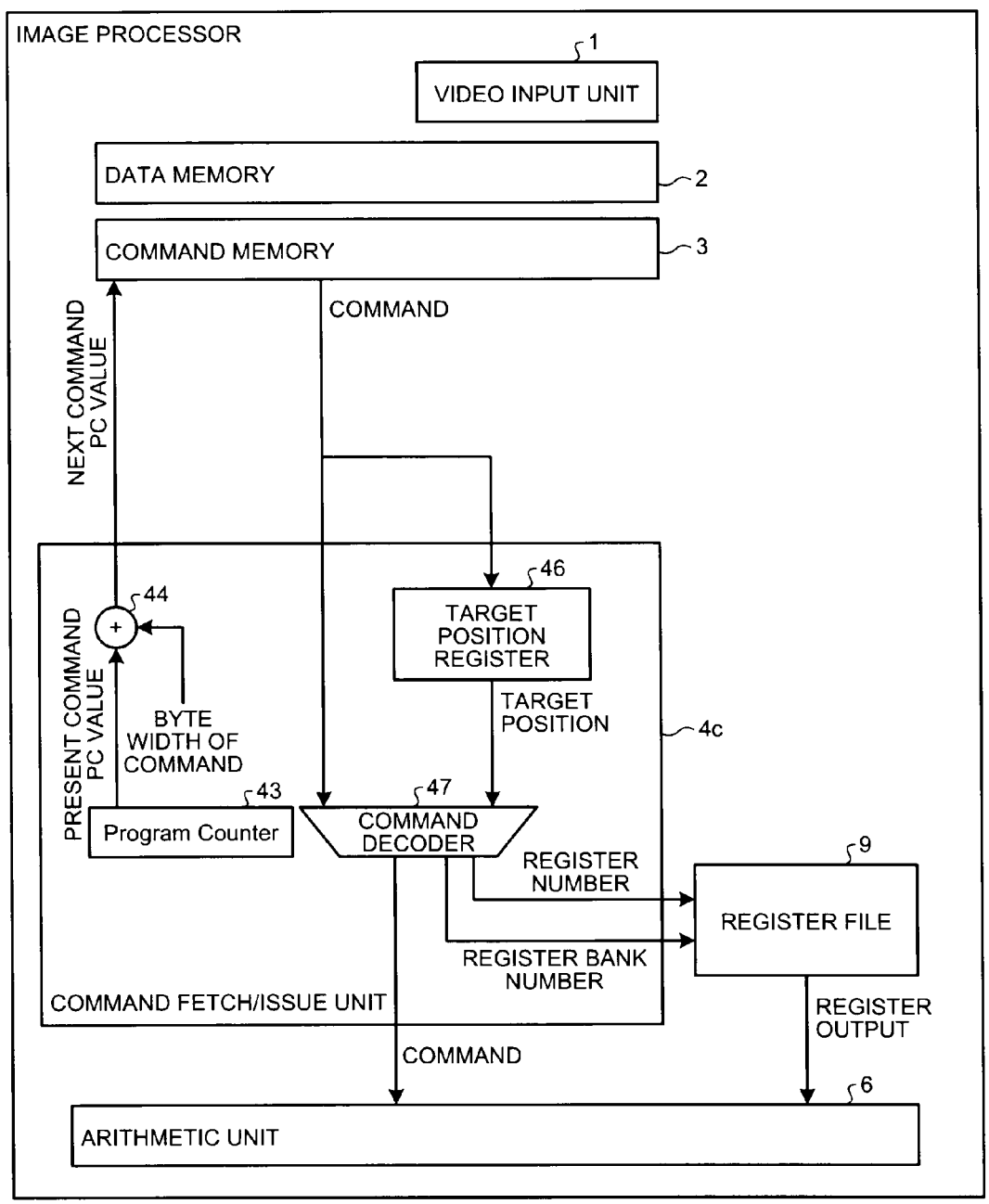
FIG. 16 is a diagram of a configuration example of an image processor according to a fourth embodiment of the present invention.

FIG. 16 is a diagram of a configuration example of an image processor according to a fourth embodiment of the present invention. The image processor includes a command fetch/issue unit 4c instead of the relative position register 7 and the command fetch/issue unit 4b of the image processor according to the third embodiment (see FIG. 10). The command fetch/issue unit 4c includes the target position register 46 same as that included in the image processor according to the second embodiment (see FIG. 8) instead of the target-position calculating unit 41.

The image processor according to this embodiment is different from the image processor according to the third embodiment in a method of acquiring a target position. Otherwise, the image processor according to this embodiment is the same as the image processor according to the third embodiment. The method of acquiring a target position is the same as the method of acquiring a target position in the image processor according to the second embodiment.

In this way, it is possible to acquire a target position using the method same as that in the image processor according to the second embodiment. In this case, it is possible to obtain effects same as those of the image processor according to the third embodiment. "To be more specific:

1) the command fetch/issue unit 4c fetches arithmetic operation command including operand register number, operand register access type, and target position register number;

2) the command decoder 47 obtains the target position of the above described command by referring to the target position register 46 that corresponds to the target position register number included in the fetched command;

3) the command decoder 47 changes the number of the operand register number and register bank depending on even number or odd number for each of "h" coordinate and "v" coordinate of the target position; and 4) a piece of data in the register file 9 is selected using the register number, and the bank number will be used for an operation in the arithmetic unit 6.

Accordingly, in the same command the value to be referred to changes depending on even-number/odd-number of each of "h" coordinate and "v" coordinate of the target position, though, the calculation can express the same process in a single command.

When the configuration according to this embodiment is adopted, it is necessary to switch a value of the target position register 46 according to a command. When the execution of a command sequence for processing data in the same pixel position continues, the value of the target position register 46 is switched before the command sequence is executed. Therefore, in the following commands, it is unnecessary to store information for indicating the pixel position by the commands. Therefore, fields of the commands can be effectively utilized for other information.

In the explanation of the third and fourth embodiments, the image processor realizes the processing for performing arithmetic operation using a different value for each of pixel colors (pixel positions) in a 2×2 pattern such as the Bayer array shown in FIG. 2. However, as patterns of pixel colors, not only the 2×2 pattern of the Bayer array but also a pattern of $2^n \times 2^n$ (n=2, 3, 4, . . . ) and the like are present. Therefore, a configuration corresponding to an array pattern of pixel colors as the repetition of $2^n \times 2^n$ is explained below.

As a configuration of an image processor corresponding to the array pattern of pixel colors as the repetition of $2^n \times 2^n$, in the configuration shown in FIG. 10 or 16 that can acquire a processing target pixel position, a configuration explained below is conceivable. A command decoder of a configuration shown in FIG. 17 is adopted and a register file shown in FIG. 18 is used or a command decoder of a configuration shown in FIG. 19 is adopted and a register file not divided into banks is used (although a register file divided into banks can be used, the register file does not always need to be divided into banks because a different value is referred to for each of the pixel colors when the command decoder shown in FIG. 19 is used).

Figure 17:
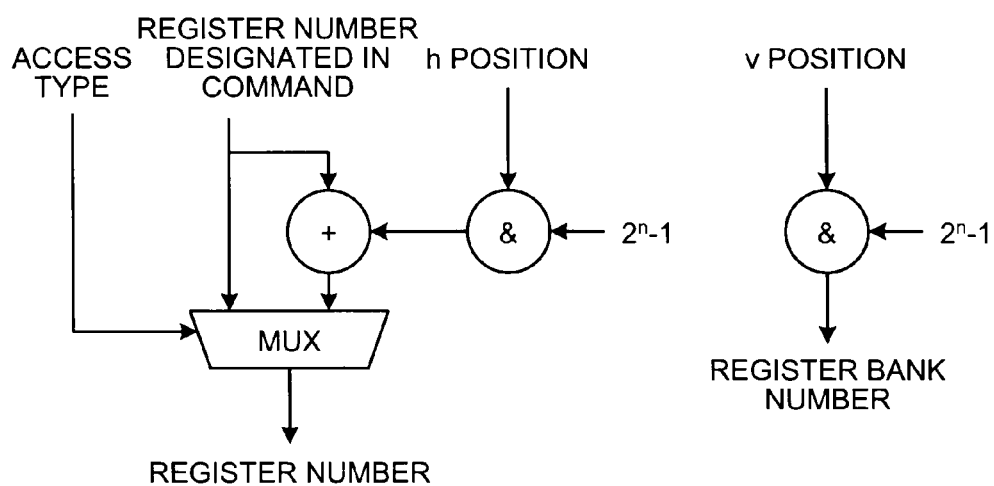
FIG. 17 is a diagram of a configuration example of a command decoder.

As processing for obtaining a register number, the command decoder shown in FIG. 17 masks an "h" position of an input target position with $2^n-1$ as shown in the figure. $2^n$ is a horizontal direction size of a pixel array pattern. For example, when the horizontal direction size is 8 (=$2^3$), $2^n-1$ is $2^3-1=7$. The command decoder masks the input "h" position with 7 to obtain a position in the horizontal direction in the pixel array pattern from the input "h" position. The command decoder adds up the position with a register number designated in the command to thereby acquire a value obtained by adding up the designated register number and the position in the horizontal direction in the pixel array pattern. The command decoder selects the acquired value and the register number designated in the command according to an access type to a register designated in the command and obtains a register number. Consequently, the command decoder can select and output, when necessary, the register number designated in the command and a number obtained by changing the designated register number according to the pixel position and the pixel array pattern.

Concerning a "v" position, similarly, the command decoder obtains a register number by masking the "v" position with a size in the "v" direction-1 ($2^n-1$).

Figure 18:
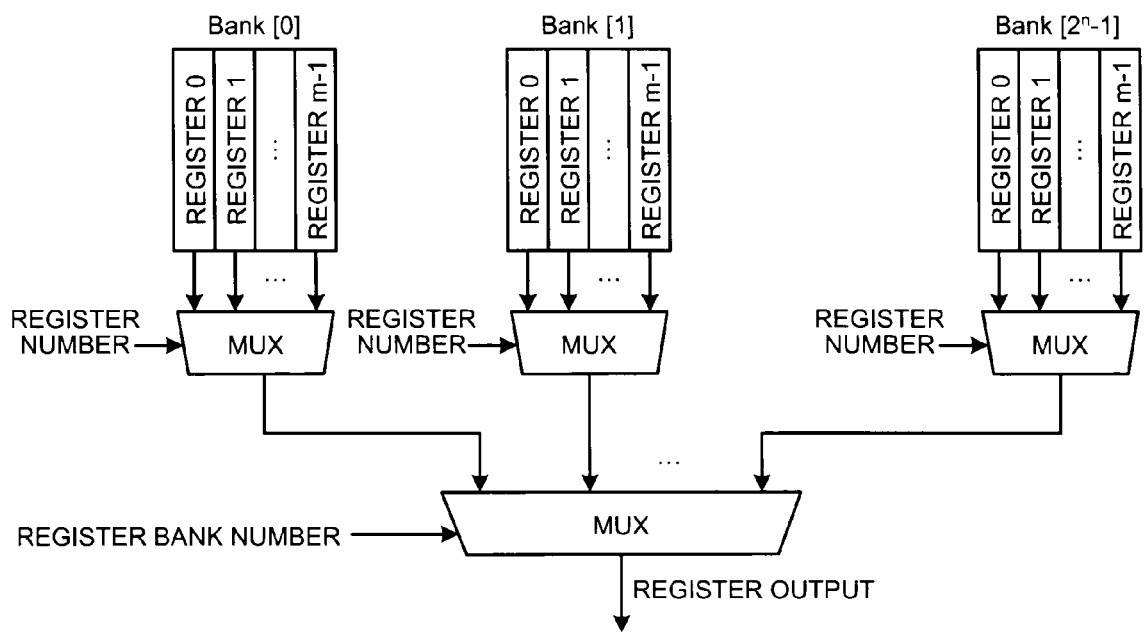
FIG. 18 is a diagram of a configuration example of a register file.
Figure 19:
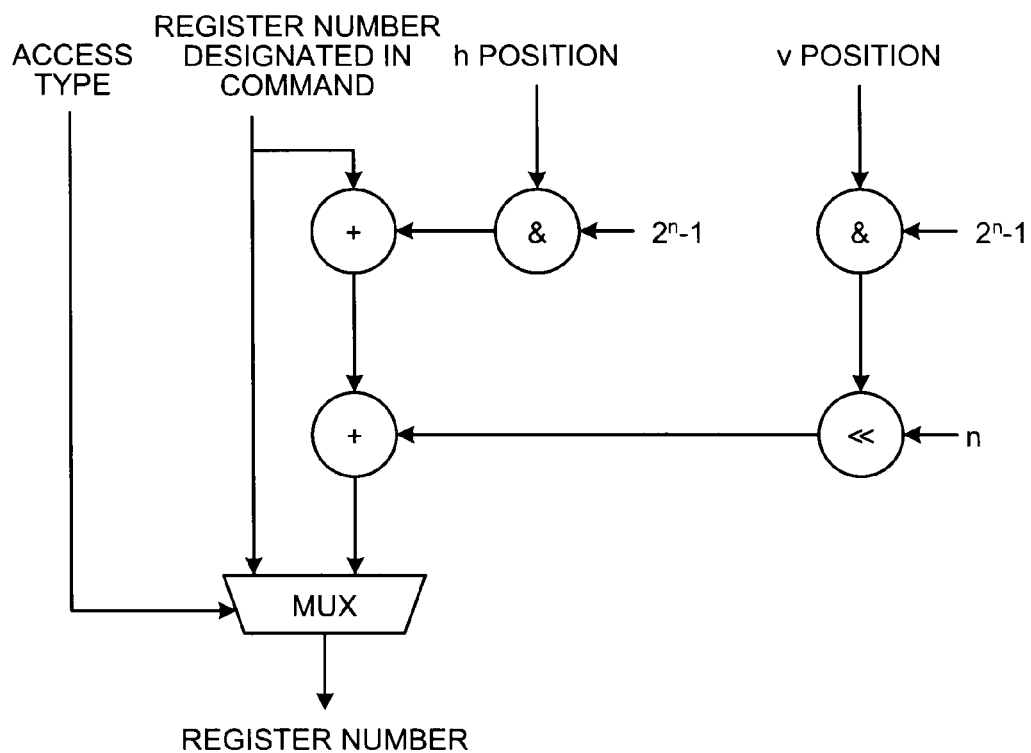
FIG. 19 is a diagram of a configuration example of a command decoder.

FIG. 18 is a diagram of a configuration example of a register file that can receive a register number and a register bank number output from the command decoder shown in FIG. 17 and refer to a specific register. When the register file shown in FIG. 13 is combined with the command decoder shown in FIG. 17, the register file needs to have, according to a size in the "v" direction of an array pattern that could be designated, register banks equivalent to the "v" direction size (in the $2^n \times 2^n$ array pattern, $2^n$ register banks). A configuration of the register file in this case is shown in FIG. 18.

The command decoder shown in FIG. 19 is an example of a command decoder in which a configuration is changed from those of the command decoders shown in FIGS. 12 and 17 and, instead of changing a register bank number, a register number is changed according to a position in the "v" direction. As shown in the figure, first, like the command decoder shown in FIG. 17, the command decoder shown in FIG. 19 calculates a horizontal direction position in a pixel array pattern of processing target data by masking an "h" position with a horizontal direction size of the pixel array pattern-1 and adds the a calculated value to a register number designated by a command (a first addition result). The command decoder masks a "v" position with a vertical direction size of the pixel array pattern-1, calculates a vertical direction position in the pixel array pattern of the processing target data, shifts a calculated value by an exponential number of 2 of the horizontal direction size of the pixel array pattern (2 in the case of a $2^2 \times 2^2$ pattern and 3 in the case of a $2^3 \times 2^3$ pattern), and adds an obtained value to the first addition result to obtain a second addition result. Consequently, in a $2^n \times 2^n$ pixel array pattern, a value in a range of "a register number designated by an arithmetic operation command+0" to "the register number designated by the arithmetic operation command+$2^n \times 2^n$-1" is obtained as the second addition result.

For example, in the case of a 4∥4 pixel pattern, when an "h" coordinate is 7 and a "v" coordinate is 5, the second addition result calculated according to a target position (hereinafter, "calculated register number") is calculated as indicated by the following Formula (3). In Formula (3), a register number designated in a command is described as "designated register number".

$$\begin{aligned}\text{(Calculated register number)} &= \text{designated register number} + \\ &\quad \{7 \mathbin{\&} (4-1)\} + \{5 \mathbin{\&} (4-1)\} << 2 \\ &= \text{designated register number} + \\ &\quad 7 \mathbin{\&} 3 + (5 \mathbin{\&} 3) << 2 \\ &= \text{designated register number} + \\ &\quad 3 + 1 << 2 \\ &= \text{designated register number} + \\ &\quad 3 + 4\end{aligned} \quad (3)$$

Similarly,
when the "h" coordinate is 4 and the "v" coordinate is 4, (calculated register number)=designated register number+ 0+0, when the "h" coordinate is 5 and the "v" coordinate is 4, (calculated register number)=designated register number+ 1+0, when the "h" coordinate is 6 and the "v" coordinate is 4, (calculated register number)=designated register number+ 2+0, when the "h" coordinate is 7 and the "v" coordinate is 4, (calculated register number)=designated register number+ 3+0, when the "h" coordinate is 4 and the "v" coordinate is 5, (calculated register number)=designated register number+ 0+4, when the "h" coordinate is 5 and the "v" coordinate is 5, (calculated register number)=designated register number+ 1+4, when the "h" coordinate is 6 and the "v" coordinate is 5, (calculated register number)=designated register number+ 2+4, and when the "h" coordinate is 7 and the "v" coordinate is 5, (calculated register number)=designated register number+ 3+4.

As explained above, in the 4×4 array pattern, the addition is performed to obtain a value in a range of "the designated register number (the register number designated in the command)+0" to "4×4−1" according to which position in the pixel array pattern a pixel position of the processing target data corresponds to and a calculated register number is obtained. A register to be referred to can be changed according to the pixel position by selecting the calculated register number or the register number designated in the command according to the designation of an access type.

When the configuration shown in FIG. 19 is adopted, it is unnecessary to switch, according to a register bank, a register to be referred to. Therefore, it is unnecessary to configure the register file with a plurality of banks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processor that applies predetermined signal processing to input image data, the image processor comprising:

a video input unit that counts a number of input pixel data; and a command fetch/issue unit calculates, when a command including information concerning a relative position register in which a delay amount from input of pixel data to the video input unit until execution of a command for the pixel data is stored is fetched, a pixel position of processing target pixel data of the fetched command based on the delay amount stored in the relative position register indicated by the information and a count result in the video input unit and executes, based on the calculated pixel position, processing for determining whether signal processing should be applied to pixel data in the pixel position, and the command fetch/issue unit includes:

a target-position calculating unit that calculates, based on the delay amount and the count result, a pixel position of the processing target pixel data of the fetched command; and a branch-condition determining unit that determines, when the command including the information concerning the relative position register is a branch command, based on the pixel position calculated by the target-position calculating unit and a branch condition code included in the branch command, whether the signal processing should be applied to the pixel data in the pixel position.

2. The image processor according to claim 1, wherein the branch-condition determining unit is configured to:

perform determination processing with an image having regularity for each of $2^n \times 2^n$ pixels (n is a positive integer) set as a processing target;

determine n−1 pixel positions after a shift, in determination processing performed when n is equal to or larger than 2, by repeatedly performing processing to determine pixel positions after the shift in a range of k=1 to n−1 after performing shifts of position information "v" in a vertical direction and position information "h" in a horizontal direction in a right direction by k bits;

separately perform, based on the branch condition code, determination concerning the pixel position before the shift and each of the n−1 pixel positions after the shift; and perform final determination based on obtained n determination results.

3. The image processor according to claim 2, wherein the branch-condition determining unit performs, in performing determination concerning each of the pixel positions after the shift, branch determination processing using, in a bit string included in the branch condition code, 4 bits specified in advance in association with a bit shift amount used in calculating each of the pixel positions.

4. An image processor that applies predetermined signal processing to input image data, the image processor comprising a command fetch/issue unit that includes a target position register, acquires, when a predetermined command is fetched, a pixel position of processing target pixel data of the fetched command from the target position register, and executes, based on the pixel position, processing for determining whether signal processing should be applied to pixel data in the pixel position, the target position register being reset to zero when signal processing for last pixel data in input image data for one frame ends and being incremented when signal processing for pixel data except the last pixel data ends, and the command fetch/issue unit includes a branch-condition determining unit that determines, when the fetched command is a branch command, based on the pixel position and a branch condition code included in the branch command, whether the signal processing should be applied to pixel data in the pixel position.

5. The image processor according to claim 4, wherein the branch-condition determining unit is configured to:

perform determination processing with an image having regularity for each of $2^n \times 2^n$ pixels (n is a positive integer) set as a processing target;

determine n−1 pixel positions after a shift, in determination processing performed when n is equal to or larger than 2, by repeatedly performing processing to determine pixel positions after the shift in a range of k=1 to n−1 after performing shifts of position information "v" in a vertical direction and position information "h" in a horizontal direction in a right direction by k bits;

separately perform, based on the branch condition code, determination concerning the pixel position before the shift and each of the n−1 pixel positions after the shift; and perform final determination based on obtained n determination results.

6. The image processor according to claim 5, wherein the branch-condition determining unit performs, in performing determination concerning each of the pixel positions after the shift, branch determination processing using, in a bit string included in the branch condition code, 4 bits specified in advance in association with a bit shift amount used in calculating each of the pixel positions.

7. A command processing method executed in an image processor, the command processing method comprising:
counting a number of input pixel data;
calculating, when a command including information concerning a relative position register in which a delay amount from input of pixel data until execution of a command for the pixel data is stored is fetched, a pixel position of processing target pixel data of the fetched command based on the delay amount stored in the relative position register indicated by the information and a count result in the counting; and
executing, based on the calculated pixel position, processing for determining whether signal processing should be applied to pixel data in the pixel position, and the executing processing includes determining, when the command including the information concerning the relative position register is a branch command, based on the pixel position calculated in the calculating and a branch condition code included in the branch command, whether the signal processing should be applied to the pixel data in the pixel position.

8. The command processing method according to claim 7, wherein the executing processing includes
performing determination processing with an image having regularity for each of $2^n \times 2^n$ pixels (n is a positive integer) set as a processing target,
determining n−1 pixel positions after a shift, in determination processing performed when n is equal to or larger than 2, by repeatedly performing processing to determine pixel positions after the shift in a range of k=1 to n−1 after performing shifts of position information "v" in a vertical direction and position information "h" in a horizontal direction in a right direction by k bits,
separately performing, based on the branch condition code, determination concerning the pixel position before the shift and each of the n−1 pixel positions after the shift; and
performing final determination based on obtained n determination results.

9. The command processing method according to claim 8, wherein the executing processing includes performing, in performing determination concerning each of the pixel positions after the shift, branch determination processing using, in a bit string included in the branch condition code, 4 bits specified in advance in association with a bit shift amount used in calculating each of the pixel positions.

10. An image processor that applies predetermined signal processing to input image data, the image processor comprising:
a video input unit that counts a number of input pixel data; and
a command fetch/issue unit calculates, when a command including information concerning a relative position register in which a delay amount from input of pixel data to the video input unit until execution of a command for the pixel data is stored is fetched, a pixel position of processing target pixel data of the fetched command based on the delay amount stored in the relative position register indicated by the information and a count result in the video input unit and executes, based on the calculated pixel position, processing for specifying an operand used in arithmetic operation for the pixel data in the pixel position, and
the command fetch/issue unit includes:
a target-position calculating unit that calculates, based on the delay amount and the count result, a pixel position of the processing target pixel data of the fetched command; and
a command decoder that specifies, when the command including the information concerning the relative position register is an arithmetic operation command, based on the pixel position calculated by the target-position calculating unit and information included in the arithmetic operation command concerning a register in which an operand is stored, an operand used in arithmetic operation for pixel data in the pixel position, and
the command decoder is configured to:
calculate a register number based on a horizontal position in a pixel array pattern and the information concerning the register in which the operand is stored; and
calculate a register bank number based on a position in a vertical direction indicated by the pixel position, and set the operand stored in the register corresponding to the register number and the register bank number as an operand used in arithmetic operation for the pixel data in the pixel position.

11. An image processor configured to apply predetermined signal processing to input image data, the image processor comprising:
a command fetch/issue unit, wherein the command fetch/issue unit:
includes a target position register;
acquires, when a predetermined command is fetched, a pixel position of processing target pixel data of the fetched command from the target position register;
executes, based on the pixel position, processing for specifying an operand used in arithmetic operation for the pixel data in the pixel position, the target position register being reset to zero when signal processing for last pixel data in input image data for one frame ends and being incremented when signal processing for pixel data except the last pixel data ends; and
includes a command decoder that specifies, when the fetched command is an arithmetic operation command, based on the pixel position and information included in the arithmetic operation command concerning a register in which an operand is stored, an operand used in arithmetic operation for pixel data in the pixel position, and the command decoder is configured to:
calculate a register number based on a horizontal position in a pixel array pattern and the information concerning the register in which the operand is stored;
calculate a register bank number based on a position in a vertical direction indicated by the pixel position; and
set the operand stored in the register corresponding to the register number and the register bank number as an operand used in arithmetic operation for the pixel data in the pixel position.

12. A command processing method executed in an image processor, the command processing method comprising:
counting a number of input pixel data;
calculating, when a command including information concerning a relative position register in which a delay amount from input of pixel data until execution of a command for the pixel data is stored is fetched, a pixel position of processing target pixel data of the fetched command based on the delay amount stored in the relative position register indicated by the information and a count result in the counting; and executing, based on the calculated pixel position, processing for specifying an operand used in arithmetic operation for the pixel data in the pixel position, and the executing processing includes specifying an operand used in arithmetic operation for pixel data in the pixel position based on the pixel position calculated in the calculating and information included in the arithmetic operation command concerning a register in which an operand is stored, when the command including the information concerning the relative position register is an arithmetic operation command, and the executing processing includes:

calculating a register number based on a horizontal position in a pixel array pattern and the information concerning the register in which the operand is stored;

calculating a register bank number based on a position in a vertical direction indicated by the pixel position; and setting the operand stored in the register corresponding to the register number and the register bank number as an operand used in arithmetic operation for the pixel data in the pixel position.

* * * * *